United States Patent
Huberland et al.

(10) Patent No.: US 8,449,648 B2
(45) Date of Patent: May 28, 2013

(54) METHOD FOR DRYING A COMPRESSED GAS

(75) Inventors: Filip Gustaaf M. Huberland, Duffel (BE); Wouter Maes, Mechelen (BE); Eduard Nieuwenhuize, AW Hulst (NL); Tim Ceyssens, Zemst (BE)

(73) Assignee: Atlas Copco Airpower, Naamloze Vennootschap, Wilrijk (BE)

(*) Notice: Subject to any disclaimer, the term of this patent is extended or adjusted under 35 U.S.C. 154(b) by 392 days.

(21) Appl. No.: 12/681,044

(22) PCT Filed: Sep. 29, 2008

(86) PCT No.: PCT/BE2008/000074
§ 371 (c)(1), (2), (4) Date: Mar. 31, 2010

(87) PCT Pub. No.: WO2009/043123
PCT Pub. Date: Apr. 9, 2009

(65) Prior Publication Data
US 2010/0229719 A1    Sep. 16, 2010

(30) Foreign Application Priority Data
Oct. 4, 2007 (BE) .................................. 2007/0479

(51) Int. Cl.
*B01D 46/46* (2006.01)

(52) U.S. Cl.
USPC ............... 95/4; 95/19; 95/22; 95/148; 95/196

(58) Field of Classification Search
USPC .................... 95/19, 4, 22, 96, 148; 34/330
See application file for complete search history.

(56) References Cited

U.S. PATENT DOCUMENTS 3,950,154 A * 4/1976 Henderson et al. ............. 96/126
7,000,332 B1 2/2006 Fresch et al.

FOREIGN PATENT DOCUMENTS

WO 2004/009218 A1 1/2004
WO 2006/050582 A1 5/2006

OTHER PUBLICATIONS

International Search Report in PCT/BE2008/000074, Jan. 5, 2009.

\* cited by examiner

*Primary Examiner* — Robert A Hopkins
(74) *Attorney, Agent, or Firm* — Bacon & Thomas, PLLC

(57) ABSTRACT

Method for drying compressed gas using a dryer with pressure vessels. The method having the steps of guiding a first part of the gas to a cooler via a regulating valve, and of subsequently drying this first part of the gas in the drying pressure vessel; and of heating a second part of the gas so as to regenerate the regenerating pressure vessel. When the temperature in the regenerating pressure vessel rises above an upper limit value, the regulating valve will be gradually moved in the direction of the shut position and, when the temperature in the regenerating pressure vessel drops under a predetermined bottom limit, the regulating valve will be gradually moved in the direction of the entirely open position, which adjustment allows to set the compressed gas at a desired temperature.

9 Claims, 2 Drawing Sheets

METHOD FOR DRYING A COMPRESSED GAS

FIELD OF INVENTION

The present invention concerns a method for drying compressed gas, in particular compressed gas coming from a compressor device.

In particular, the invention concerns a method for drying compressed gas by means of a dryer having at least two pressure vessels which are filled with a desiccant or drying agent, which pressure vessels work alternately, such that when one pressure vessel is busy drying the compressed gas, the other pressure vessel will be regenerated.

BACKGROUND

Such a drying method is already known, whereby, in order to dry the compressed gas coming from the compressor device, a part of the gas is first cooled in a cooler and then sent through the drying pressure vessel and whereby, in order to regenerate the other pressure vessel, the non-cooled part of the gas is guided through the regenerating pressure vessel so as to absorb the adsorbed moisture from the drying means by means of the compression heat stored in this part of the gas to be dried.

A disadvantage of the known methods for drying compressed gas is that the pressure dew point of the dried compressed gas at the outlet of the dryer, depending on the working conditions of the dryer and the compressor device, can be relatively high.

Thus, with the known methods, in an environment with a low air humidity, better results are often obtained than in hot, damp environments.

In order to remedy this, it is known to additionally heat the part of non-cooled gas which is used to regenerate the drying agent by means of a heating element provided to that end, such as an electric heating element, to thus improve the dew point.

Since only the gas part needs to be heated which is used to regenerate one of the pressure vessels, a small and thus cheap and compact heating element will do, and thus only relatively little power is required to heat said limited gas stream.

As the heating power of the heating element is limited, one must pay attention that the volume of gas which is sent to this heating element to regenerate the regenerating pressure vessel is not too large. For, when this partial flow to the heating element becomes too high, the aimed temperature rise of the gas stream cannot be reached, as a result of which the dryer can no longer function as required.

Moreover, restricting this non-cooled gas stream to the heating element is advantageous in that use can be made of smaller pipe diameters and valves, such that a cheaper installation can be provided to implement the drying method.

In order to adjust the flow of the non-cooled part of compressed gas flowing to the heating element, use is made according to the known drying methods of a flow measurement of the gas stream to the heating element, and the volume of non-cooled gas that is supplied from the gas stream to be dried, entering the dryer, is adjusted on the basis of the above-mentioned flow measurement carried out by means of a flow meter provided to that end in the line to the heating element according to the known method.

A major factor that made such a flow measurement necessary up to now, is that a minimal gas stream must always be provided over the heating element, in order to make sure that:

the heating element cannot become damaged due to overheating; and that a correct temperature measurement of the gas is made possible, since the temperature to be measured (which is decisive for the pressure dew point at the outlet of the dryer) must be transferred to a temperature sensor provided to that end, which requires such a minimal gas stream.

Applying a flow measurement by means of a flow meter is disadvantageous, however, in that:

such a flow meter is expensive, a stable gas flow is required at the flow meter in order to be able to carry out a precise measurement, to which end a minimal length of straight line must be provided, upstream and downstream of the flow meter, which has a negative effect on the dimensions and price of the dryer and moreover results in that the dryer's construction strongly differs from the embodiments without a heating element, as a result of which parts are not interchangeable and thus must be manufactured in smaller numbers, which is relatively expensive;

a pressure drop and consequently a loss of energy occurs when the gas stream flows over or through the flow meter;

the reliability of the dryer entirely depends on the good working order of the flow meter; and when the partial flow to the heating element is kept constant, an adjustment will be required to switch said heating element on and off in order to prevent the temperature from deviating too much from the set value. This has for a result that the available heating power is not optimally used and that the heating step must be prolonged somewhat more, such that more drying agent must be provided, as a result of which it takes longer to regenerate an amount of drying agent.

SUMMARY

The present invention aims to remedy the above-mentioned and other disadvantages.

To this end, the present invention concerns a method for drying compressed gas by means of a dryer comprising at least two pressure vessels which are filled with a desiccant or drying agent, which pressure vessels work alternately, such that while one pressure vessel is busy drying the compressed gas, the other pressure vessel is being regenerated, whereby this method comprises the steps of guiding a first part of the compressed gas to be dried entering the dryer to a cooler via a regulating line with a regulating valve in it, and of subsequently drying the cooled first part of the gas in the drying pressure vessel; and of heating a second part of the gas to be dried for regenerating the regenerating pressure vessel, whereby, when the temperature in the regenerating pressure vessel rises above a predetermined upper limit, the above-mentioned regulating valve will be gradually moved in the direction of the shut position and, when the temperature in the regenerating pressure vessel drops under a predetermined bottom limit, the regulating valve will be gradually moved in the direction of the entirely open position, which adjustment allows to set the compressed gas at a desired temperature An advantage of such a method according to the invention consists in that the use of a flow meter is no longer required, which offers the following additional advantages:

the dryer can be made cheaper than conventional dryers which are provided with a flow meter;

no stable gas flow must be provided, as a result of which the dimensions and the price of the dryer decrease compared to those of the existing dryers with a flow meter, and as a result of which there are no constructional differences compared to embodiments without a heating element, such that parts are exchangeable and thus can be manufactured in larger numbers, which is cheaper;

as there is no flow meter, there can be no pressure drop and thus no energy loss over such a flow meter;

the reliability of the dryer increases as it does not depend on the good working of a flow meter; and the available heating power is constantly used as a whole, such that the required regeneration time is minimised, which reduces the required amount of drying agent in the pressure vessels.

Another advantage of a method according to the invention is that, despite the fact that no use is made of a flow measurement, the compressed gas can nevertheless be set at a desired temperature.

According to a preferred characteristic, the method according to the invention also comprises the steps of determining the pressure drop over the regulating valve, and, as soon as the pressure drop over the regulating valve falls under a preset minimum threshold value, not opening the regulating valve any further, for example by slowly closing said regulating valve until the pressure drop over said regulating valve rises above the preset minimum threshold value again, and subsequently resuming the adjustment on the basis of the temperature measurement in the regenerating pressure vessel.

This is advantageous in that it is made sure that the second portion of gas which is carried to the heating element always has a sufficiently large flow so as to avoid overheating of said heating element under all ambient conditions.

Another advantage of such a method is that the working conditions of the dryer may change at any time during the adjustment without this having any influence on the performance of the dryer, provided there is a continuous control of the minimally required gas stream over the heating element.

BRIEF DESCRIPTION OF THE DRAWINGS

In order to better explain the characteristics of the present invention, the following preferred method according to the invention is described by way of example only without being limitative in any way, with reference to the accompanying drawings, in which:

FIG. 2 represents the compressor device according to FIG. 1 while it is in use.

DETAILED DESCRIPTION OF VARIOUS EMBODIMENTS OF THE DISCLOSURE

Figure 1:
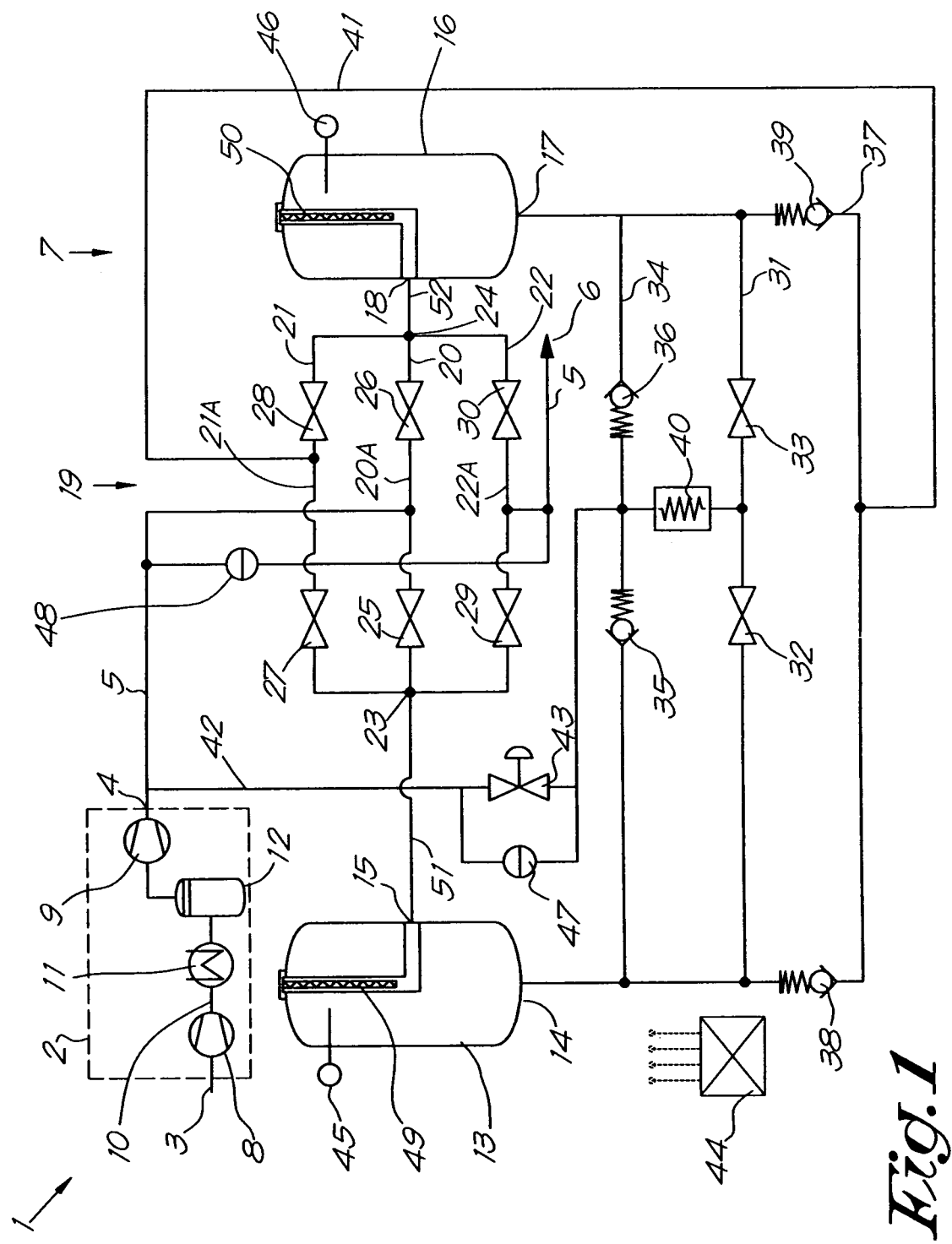
FIG. 1 represents a compressor device for applying a method according to the invention.
Figure 9:
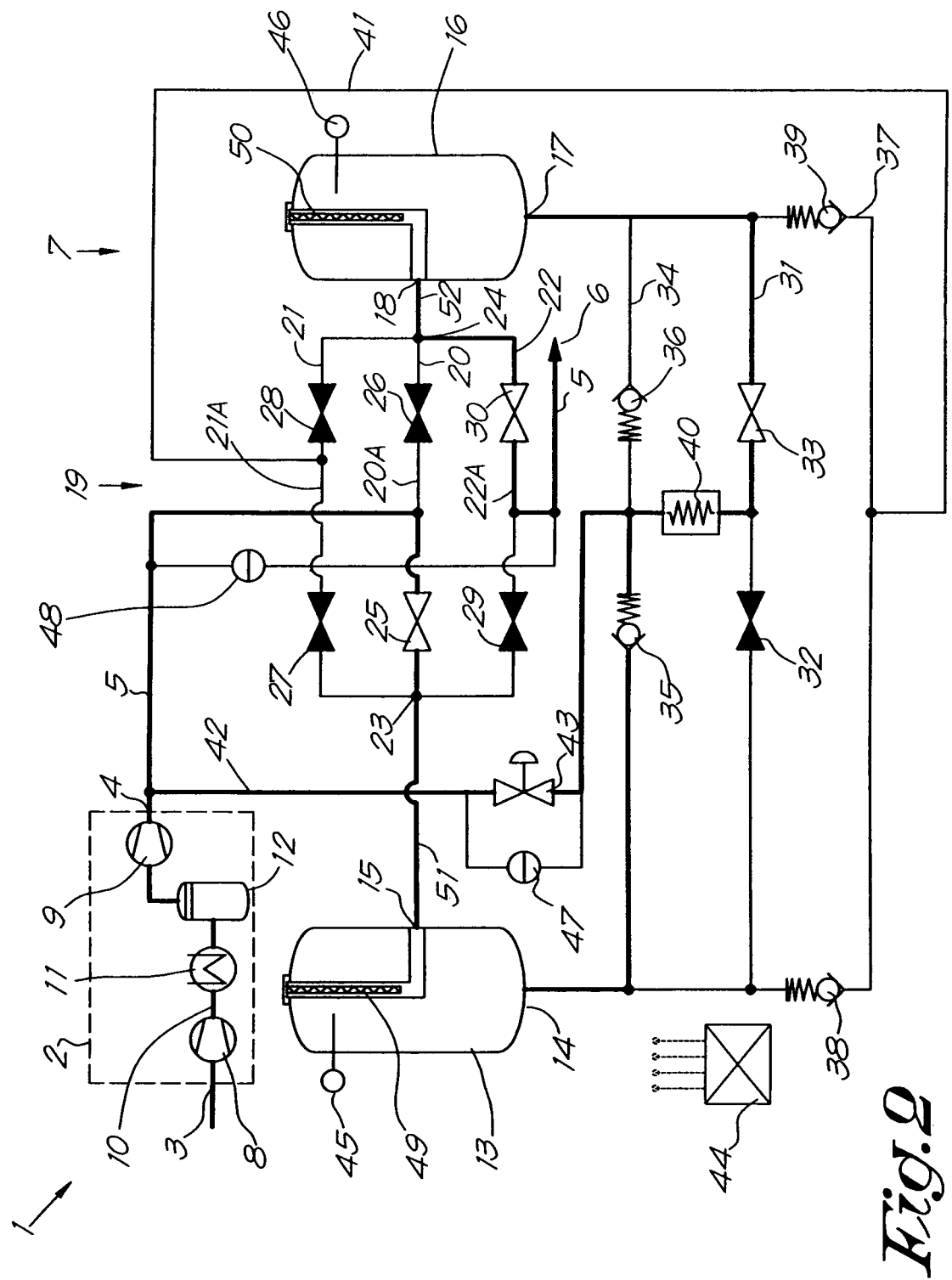

FIG. 1 shows a compressor device 1 which mainly consists of a compressor 2 with an inlet 3 and an outlet 4; a compressed air line 5 which connects the outlet 4 of the compressor 2 to a consumer network 6 and a dryer 7 which is incorporated in the above-mentioned compressed air line 5.

The compressor 2 in this case consists of a low pressure stage 8 and a high pressure stage 9 connected in series by means of a pressure pipe 10 in which an intercooler 11 and a water separator 12 have been successively incorporated.

The dryer 7 comprises a first pressure vessel 13 with an inlet 14 and an outlet 15 containing a silica gel or any other drying agent; a second pressure vessel 16 with an inlet 17 and an outlet 18, which also contains a drying agent.

Further, the dryer 7 is provided with a distribution device 19 consisting of three lines, a first line 20, a second line 21 and a third line 22 respectively, whereby these three lines 20-22 are connected parallel to one another with their respective far ends 23 and 24.

In each of the lines 20-22 are in this case provided two shut-off valves connected in series, i.e. shut-off valves 25 and 26 in the first line 20; shut-off valves 27 and 28 in the second line 21; and shut-off valves 29 and 30 in the third line 22 respectively.

Each of the outlets 15 and 18 of both pressure vessels 13 and 16 is connected via the above-mentioned first and third lines 20 and 22 and via a shut-off valve 25 and 29, 26 and 30 respectively, in each line part 20A and 22A extending in a respective line 20 and 22 between the shut-off valves 25 and 26, 29 and 30 respectively, to the main compressed air line 5, whereby this compressed air line 5 is interrupted between the above-mentioned connections of the line parts 20A and 22A onto the compressed air line 5.

The inlets 14 and 17 are mutually connected by means of three connecting lines, a first connecting line 31 with two shut-off valves 32 and 33, a second connecting line 34 with non-return valves 35 and 36 working in opposite ways, and a third connecting line 37, also with two non-return valves 38 and 39 working in opposite ways respectively.

In the given example, the above-mentioned non-return valves 35 and 36 in the second connecting line 34 are placed such that they allow for a flow in the direction of one non-return valve to the other non-return valve in the line 34 concerned, ant the above-mentioned non-return valves 38 and 39 in the third connecting line 37 are placed such that they allow for a flow in the direction away from the other non-return valve in the line 37 concerned.

The first and second connecting lines are bridged by a cooler 40 which is connected to the second connecting line 34 with its inlet, in particular between the non-return valves 35 and 36 in said line 34, and which is connected to the first connecting line 31 with its outlet, in particular between the shut-off valves 32 and 33 of said line 31.

A bypass 41 is provided which is connected to the third connecting line 37 with one far end, in particular between the non-return valves 38 and 39 in said line 37 and which is connected to the above-mentioned second line 21 with its other far end, in particular to the line part 21A of said line 21 which extends between the shut-off valves 27 and 28 in the line 21.

Further, the dryer 7 comprises a regulating line 42 which is connected to the above-mentioned compressed air line 5, in particular between the outlet 4 of the compressor 2 and the connection of the line part 20A to said compressed air line 5.

In said regulating line 42 is provided a regulating valve 43 which in this case has the form of a controllable valve.

The compressor device 1 is preferably also provided with a regulator 44 which makes it possible to open or close the shut-off valves 25-30, 32 and 33 and whereby this regulator 44 is in this case also connected to the regulating valve 43 in order to adjust it.

The compressor device 1 is further equipped with measuring devices to measure for example temperatures and pressures, and if need be also the dew point, which measuring devices are connected to the above-mentioned regulator 44 in order to control the compressor device 1.

According to the invention, the above-mentioned measuring devices comprise at least two temperature sensors, in particular a temperature sensor 45, 46 respectively in each pressure vessel 13, 16 respectively.

In this case, but not necessarily, the above-mentioned measuring devices also comprise measuring means 47 to determine the pressure drop over the regulating valve 43.

If required, the measuring devices may also comprise measuring means 48 to determine the pressure drop over the dryer 7.

Finally, the dryer 7 according to the invention is further provided with heating elements 49, 50 respectively, which in this case are each provided in a respective pressure vessel 13 and 16 to heat the regenerating gas stream, but which can also be provided in the line parts 51, 52 respectively extending between the above-mentioned distribution device 19 on the one hand, and a pressure vessel 13, 16 respectively on the other hand, or in another place which makes it possible to heat a part of the gas stream.

Also the above-mentioned heating elements 49 and 50 can be connected to the above-mentioned regulator 44 according to the invention in order to switch said heating elements 49 and 50 on and off.

The working of the compressor device 1 and of the dryer 7 is very simple and is illustrated by means of FIG. 2, whereby shut-off valves 25-30, 32 and 33 are represented in black in their closed position, and are represented in white in their open position, and whereby the path followed by the compressed gas is represented in bold.

The control of the shut-off valves 25-30, 32 and 33, the switching on and off of the heating elements 49 and 50, the adjustment of the position of the regulating valve 43 and the processing of measuring signals is carried out in this example by one and the same regulator 44; however, it goes without saying that also two or more separate regulators can be used to control all the aforesaid components, or that some of said components can be switched manually.

In the situation as represented in FIG. 2, the pressure vessel 16 acts as a drying pressure vessel, whereas the pressure vessel 13 is regenerated.

To this end, the gas stream to be dried is pumped as of the outlet 4 in the compressed air line 5, after which said gas stream is split in two partial flows.

A first part of the compressed gas is pumped via the regulating line 42 and through the regulating valve 43 to the cooler 40, after which the cooled gas, via the open shut-off valve 33, is sent to the inlet 17 of the drying pressure vessel 16 in order to be dried by the drying agent.

The heating element 50 in the drying pressure vessel 16 is switched off.

After its passage through the pressure vessel 16, the first part of compressed gas, which is dry then, is pumped via the opened shut-off valve 30 to the compressed air line 5 and then to a consumer network 6.

A second part of the compressed gas to be dried entering the dryer 7 is sent via the compressed air line 5 to the distribution device 19, in particular to the line part 20A of the first line 20, to be subsequently sent via the opened shut-off valve 25 to the outlet 15 of the regenerating pressure vessel 13.

The second part of the gas to be dried then flows along the heating element 49 which is switched on, provided in the pressure vessel 13, to further heat said second part of the gas, after which this gas flows counterflow through the drying agent in the pressure vessel 13 to the entry 14, in order to regenerate the drying agent.

The heating element 49 remains switched on during the entire regeneration step of the regenerating pressure vessel 13.

After its passage through the pressure vessel 13, the second part of the gas to be dried flows via the non-return valve 35 in the second connecting line 34 to the regulating line 42, where said second part of the gas is mixed with the first part of the gas to be dried, after which the gas stream as a whole flows to the cooler 40.

The method according to the invention is characterised in that, when the temperature which is measured by the temperature sensor 45 in the regenerating pressure vessel 13 rises above a predetermined upper limit value, the above-mentioned regulating valve 43 will be shut, and when the temperature in the regenerating pressure vessel 13 drops under a predetermined lower limit value, the regulating valve 43 will be opened.

The application of such a control makes a flow meter redundant, as a result of which costs can be saved among others and a simplified dryer 7 can be obtained.

By "the regulating valve 43 is shut" is meant that the valve position of the regulating valve 43 is gradually changed in the direction of the entirely shut position, but it does not necessarily mean that the valve is entirely and immediately shut. Analogously, by "the regulating valve 43 is opened" is meant that the valve position of the regulating valve 43 is gradually moved in the direction of the entirely open position, but the entirely open position must not necessarily be actually or suddenly reached.

In order to make sure that a predetermined minimum flow of compressed gas constantly flows to the switched-on heating element 45 in the regenerating pressure vessel 13, the method according to the invention preferably comprises the step of determining the pressure drop over the regulating valve 43 by means of the measuring means 47, and, as soon as the measured pressure drop over the regulating valve 43 drops under a pre-determined minimum threshold value, the regulating valve 43 will not be opened any further.

What precedes can be realised for example by initially calibrating the regulating valve 43, whereby this initial calibration consists in fixing a valve position for the regulating valve 43 which corresponds to a pre-determined minimal pressure drop over said regulating valve 43, corresponding to a minimally required flow of compressed gas to be dried to the regenerating pressure vessel 13 and, while the regulating valve 43 is being adjusted, applying said fixed valve position as the maximum opening position for said regulating valve 43.

Another method for realising what precedes consist in, as soon as the measured pressure drop over the regulating valve 43 drops under the above-mentioned pre-determined minimum threshold value, slowly shutting the regulating valve until the measured pressure drop over said regulating valve 43 rises above the pre-determined minimum threshold value again, and subsequently resuming the adjustment on the basis of the temperature measurement in the regenerating pressure vessel 13.

The latter method can also be further extended, whereby a principle of hysteresis is applied and whereby, as soon as the measured pressure drop over the regulating valve 43 drops under a first pre-determined threshold value, the regulating valve 43 is slowly shut until the measured pressure drop over said regulating valve 43 either rises above a second threshold value which is larger than the above-mentioned first threshold value, or until the pressure drop has risen above the above-mentioned first threshold value during a certain minimum length of time.

In this way is made sure that the control of the regulating valve 43 does not remain in a transitional state, whereby said regulating valve 43 is constantly being opened and shut as the measured pressure drop fluctuates round the desired value which corresponds to a predetermined minimum flow of compressed gas flowing to the regenerating pressure vessel 13.

As already mentioned above, the regulating valve 43 is in this case adjusted by means of a regulator 44, to which end the required control algorithm has been programmed in the regulator, with the accompanying threshold and/or limit values of the temperature in the regenerating pressure vessel 13 and the pressure drop over the regulating valve 43.

Following the situation as represented in FIG. 2, whereby the pressure vessel 13 is regenerated and the pressure vessel 16 is used to dry the compressed gas, the flow through the dryer 7 is changed, by switching the shut-off valves in the known manner, whereby the pressure vessel 13 is cooled and then becomes the drying pressure vessel, while the pressure vessel 16 will be regenerated.

The present invention is by no means restricted to the methods and embodiments described by way of example and represented in the accompanying drawings; on the contrary, such a method according to the invention for drying a compressed gas can be realised in many ways while still remaining within the scope of the invention.

The invention claimed is:

1. A method for drying compressed gas comprising:
    providing a gas dryer with at least two pressure vessels to which compressed gas is supplied and filling the pressure vessels with a desiccant or drying agent;
    operating the pressure vessels alternately, such that when one pressure vessel is drying compressed gas, the other pressure vessel is being regenerated;
    guiding a first part of the compressed gas to be dried entering the dryer to a cooler via a regulating line having a regulating valve therein;
    subsequently drying the cooled first part of the gas in a first of the two pressure vessels, this first pressure vessel acting as a drying pressure vessel;
    heating a second part of the compressed gas to be dried for use in regenerating the second or regenerating pressure vessel, wherein, when the temperature in the second or regenerating pressure vessel rises above a predetermined upper limit, the regulating valve is gradually moved in the direction of a shut position and, when the temperature in the regenerating pressure vessel drops under a predetermined bottom limit, the regulating valve is gradually moved in the direction of an entirely open position, said movement of the regulating valve enabling the temperature of the first part of the compressed gas to be set at a desired temperature before entering the cooler, and
    measuring the pressure drop over the regulating valve, and, when the measured pressure drop over the regulating valve drops under a pre-determined minimum threshold value, not opening said regulating valve any further.

2. The method according to claim 1, comprising the step of slowly shutting the regulating valve as soon as the measured pressure drop over the regulating valve drops under the pre-determined minimum threshold value, until the measured pressure drop over said regulating valve rises above the pre-determined minimum threshold value again, and of subsequently resuming the movement of the regulating valve on the basis of the temperature measurement in the regenerating pressure vessel.

3. The method according to claim 1, comprising the step of slowly shutting the regulating valve as soon as the measured pressure drop over the regulating valve drops under a first pre-determined threshold value, either until the measured pressure drop over said regulating valve rises above a second threshold value which is larger than the first threshold value, or until the pressure drop has risen above the first threshold value during a certain minimum length of time.

4. The method according to claim 1, comprising the step of initially calibrating the regulating valve by fixing a valve position for the regulating valve which corresponds to a predetermined minimal pressure drop, corresponding to a minimally required flow of compressed gas to be dried to the regenerating pressure vessel, and while the regulating valve is being calibrated, applying said valve position as the maximum opening position for said regulating valve.

5. The method according to claim 1, wherein the process does not use a flow meter.

6. A method for drying compressed gas comprising:
    providing a gas dryer with at least two pressure vessels to which compressed gas is supplied and filling the pressure vessels with a desiccant or drying agent;
    operating the pressure vessels alternately, such that when one pressure vessel is drying compressed gas, the other pressure vessel is being regenerated;
    guiding a first part of the compressed gas to be dried entering the dryer to a cooler via a regulating line having a regulating valve therein;
    subsequently drying the cooled first part of the gas in a first of the two pressure vessels, this first pressure vessel acting as a drying pressure vessel;
    heating a second part of the compressed gas to be dried for use in regenerating the second or regenerating pressure vessel, wherein, when the temperature in the second or regenerating pressure vessel rises above a predetermined upper limit, the regulating valve is gradually moved in the direction of a shut position and, when the temperature in the regenerating pressure vessel drops under a predetermined bottom limit, the regulating valve is gradually moved in the direction of an entirely open position, said movement of the regulating valve enabling the temperature of the first part of the compressed gas to be set at a desired temperature before entering the cooler; and
    controlling the regulating valve by using a regulator which is connected to a pressure measuring device to determine the pressure drop over the regulating valve and temperature sensors in the respective pressure vessels.

7. The method according to claim 6, including heating the second part of the gas to be dried by using a heating element which is switched on and off by the regulator.

8. The method according to claim 7, comprising the step of keeping the heating element switched on in order to heat the second part of the gas during the entire regeneration step.

9. The method according to claim 6, wherein the process does not use a flow meter.

\* \* \* \* \*